United States Patent
Dierksmeier et al.

(10) Patent No.: US 12,018,581 B2
(45) Date of Patent: Jun. 25, 2024

(54) COMPRESSOR TURBINE WHEEL

(71) Applicant: Rolls-Royce North American Technologies Inc., Indianapolis, IN (US)

(72) Inventors: Douglas David Dierksmeier, Franklin, IN (US); Michael A. Karam, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 17/857,560

(22) Filed: Jul. 5, 2022

(65) Prior Publication Data

US 2022/0349308 A1    Nov. 3, 2022

Related U.S. Application Data

(62) Division of application No. 16/983,695, filed on Aug. 3, 2020, now abandoned.

(51) Int. Cl.
| F01D 5/04 | (2006.01) |
| F01D 5/02 | (2006.01) |
| F01D 25/12 | (2006.01) |

(52) U.S. Cl.
CPC .............. *F01D 5/043* (2013.01); *F01D 5/021* (2013.01); *F01D 25/12* (2013.01); *F05D 2220/32* (2013.01); *F05D 2240/24* (2013.01); *F05D 2260/221* (2013.01)

(58) Field of Classification Search
CPC ........... F01D 5/021; F01D 5/043; F01D 5/045
See application file for complete search history.

(56) References Cited

U.S. PATENT DOCUMENTS

| 2,709,893 | A | * | 6/1955 | Birmann | F02C 3/05 |
| | | | | | 417/406 |
| 4,923,370 | A | | 5/1990 | Larson et al. | |
| 4,981,018 | A | * | 1/1991 | Jones | F02C 3/08 |
| | | | | | 60/726 |
| 5,097,660 | A | * | 3/1992 | Shekleton | F01D 5/046 |
| | | | | | 415/115 |
| 5,129,284 | A | | 7/1992 | Brueckner et al. | |
| 5,145,317 | A | | 9/1992 | Brasz | |
| 5,207,054 | A | | 5/1993 | Rodgers et al. | |
| 5,299,909 | A | | 4/1994 | Wulf | |
| 5,730,582 | A | | 3/1998 | Heitmann | |
| 6,324,831 | B1 | * | 12/2001 | Izadi | F01D 5/026 |
| | | | | | 29/889.21 |
| 7,481,625 | B2 | | 1/2009 | Kim | |
| 7,628,018 | B2 | | 12/2009 | Mowill | |

* cited by examiner

*Primary Examiner* — Justin D Seabe
*Assistant Examiner* — John S Hunter, Jr.
(74) *Attorney, Agent, or Firm* — Barnes & Thornburg LLP

(57) ABSTRACT

A turbine wheel for a gas turbine engine including a compressor impeller and a radial inflow turbine integral to or attached to the compressor impeller is provided. A compressor turbine wheel including features to increase surface area of a surface of the compressor impeller and/or the radial inflow turbine and/or a passage to flow air between the compressor impeller and the radial inflow turbine is further provided. Methods for cooling radial inflow turbines integral to compressor impellers are further provided.

20 Claims, 8 Drawing Sheets

COMPRESSOR TURBINE WHEEL

RELATED APPLICATIONS

This application is a divisional of U.S. patent application Ser. No. 16/983,695, filed Aug. 3, 2020, titled COMPRESSOR TURBINE WHEEL, the contents of which are hereby incorporated by reference.

TECHNICAL FIELD

This disclosure relates to gas turbine engines, and, more specifically, to compressor turbine wheels of gas turbine engines.

BACKGROUND

Gas turbine engines are used on vehicles such as airplane and helicopters. These engines are internal combustion engines that operate to produce thrust by discharging a high velocity exhaust. Some gas turbine engines may also include fan blades to create thrust.

Gas turbine engines include one or more compressors, a combustor and one or more turbines. Air is compressed in the compressor(s), mixed with fuel in the combustor and ignited, such that exhaust gases are created and discharged through a turbine to create thrust. The exhaust gas rotates the turbine, which is typically used to turn a shaft and produce shaft work output, such as to drive the compressor or a gearbox. There may be one or more turbines and corresponding shafts producing shaft work output. Systems within a gas turbine engine may use the shaft work output.

Some existing gas turbine engine compressor impellers and radial inflow turbines have various shortcomings, drawbacks, and disadvantages relative to certain applications. Accordingly, there remains a need for further contributions in this area of technology.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

Figure 1:
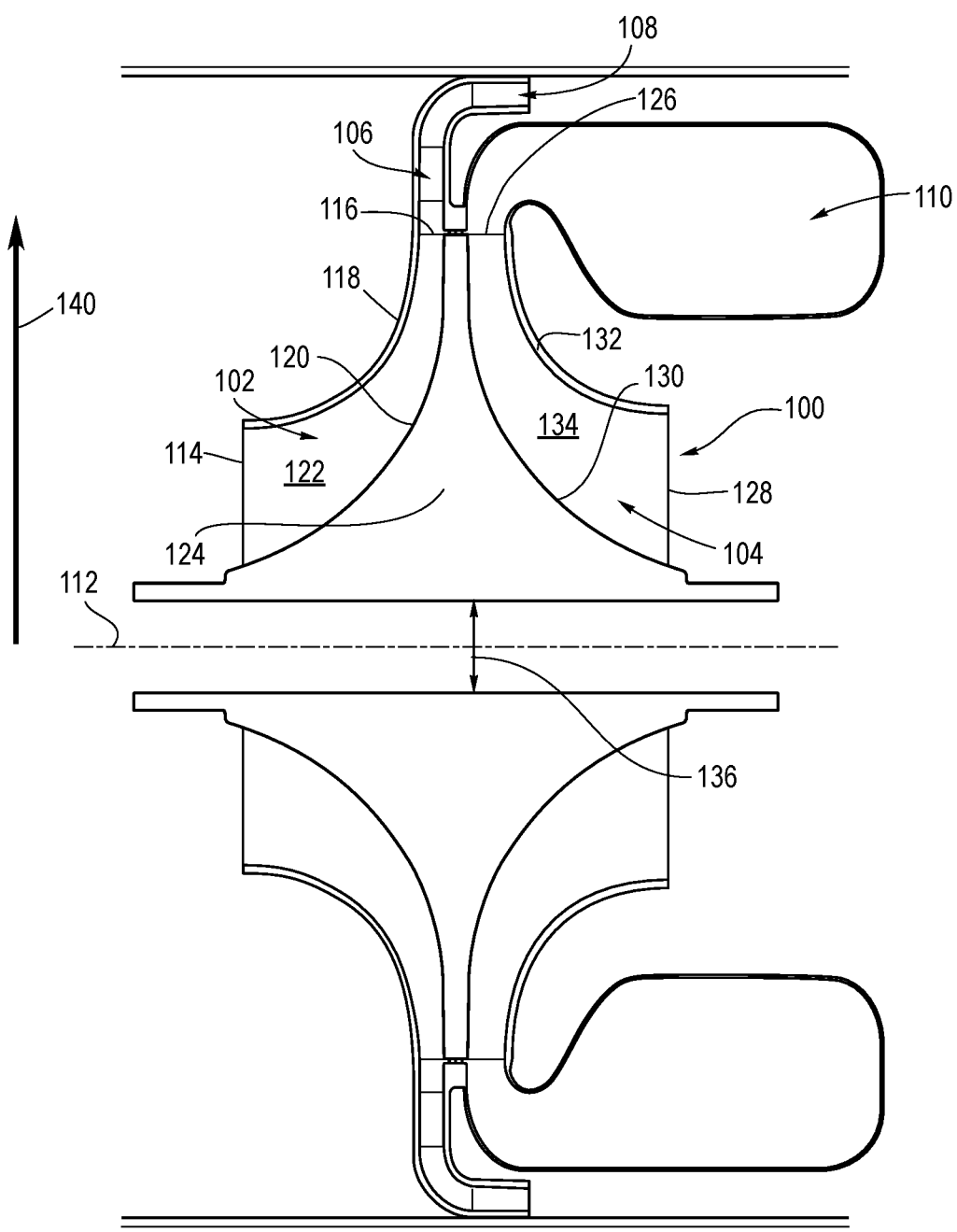
FIG. 1 illustrates a diametrical, forward-aft axial cross-sectional view of an example of a compressor turbine wheel.

The drawings described herein are for illustration purposes only and are not intended to limit the scope of the present disclosure in any way.

DETAILED DESCRIPTION

According to an example of the present disclosure, a compressor turbine wheel is rotatable about a forward-aft axis. The compressor turbine wheel includes a compressor impeller and a radial inflow turbine aft of the compressor impeller. The compressor turbine wheel includes a forward-axial wheel bore circumferentially about the forward-aft axis. The compressor impeller includes a forward impeller vane inlet, a radial impeller vane outlet configured to flow compressed air radially outward to a diffuser, an aft inner surface extending from the forward impeller vane inlet to the radial impeller vane outlet, and inner vane side walls projecting forward from the aft inner surface. The radial inflow turbine includes a radial turbine vane inlet configured to receive combustion gases from a combustor, an aft turbine vane outlet, a forward inner turbine surface extending from the radial turbine vane inlet to the aft turbine vane outlet, and inner turbine vane side walls projecting aft from the forward inner turbine surface. The radial inflow turbine is integral to the compressor impeller so as to be a combined compressor impeller and radial inflow turbine. Alternatively, the radial inflow turbine is fixed to the compressor impeller to form a combined compressor impeller and radial inflow turbine. The aft inner surface and/or the inner vane side walls may include one or more ribs configured to increase surface area of the aft inner surface and/or the inner vane side walls. The forward inner turbine surface and/or the inner turbine vane side walls may include one or more pins, one or more ribs, one or more vanes, and/or one or more turbulators configured to increase surface area of the forward inner turbine surface. A passage may extend between the aft inner surface and the forward inner turbine surface, the passage configured to direct flow of air between the compressor impeller and the radial inflow turbine. The compressor turbine wheel may be configured to cool the radial inflow turbine by conduction from the radial inflow turbine to the compressor impeller. The compressor turbine wheel may be for example, cast, injection-molded, or printed.

According to another example of the present disclosure, a compressor turbine wheel is rotatable about a forward-aft axis passing through a forward-aft axial wheel bore at a center of the compressor turbine wheel. The compressor turbine wheel includes a compressor impeller and a radial inflow turbine aft of the compressor impeller. The compressor impeller includes a forward impeller vane inlet, a radial impeller vane outlet configured to flow compressed air radially outward to a diffuser, an aft inner surface extending from the forward impeller vane inlet to the radial impeller vane outlet, and inner vane side walls projecting forward from the aft inner surface. The radial inflow turbine includes a radial turbine vane inlet configured to receive combustion gases from a combustor, an aft turbine vane outlet, a forward inner turbine surface extending from the radial turbine vane inlet to the aft turbine vane outlet, and inner turbine vane side walls projecting aft from the forward inner turbine surface. The radial inflow turbine is integral to the compressor impeller, or an aft outer surface of the compressor impeller is fixed to a forward outer surface of the radial inflow turbine. A passage extends between the aft inner surface and the forward inner turbine surface.

According to yet another example of the present disclosure, a method of cooling a radial inflow turbine of a gas turbine engine rotatable about a forward-aft axis, comprising: transferring heat from the radial inflow turbine to a compressor impeller via conduction through the radial inflow turbine and the compressor impeller. The radial inflow turbine is integral to the compressor impeller, or an aft outer surface of the compressor impeller is fixed to a forward outer surface of the radial inflow turbine.

One interesting feature of the devices and methods described herein below may be to decrease the physical dimensions of combined compressor impellers and radial inflow turbines. Alternatively, or in addition, an interesting feature of the devices and methods described herein below may be that the cost of combined compressor impellers and radial inflow turbines is less than conventional arrangements. Alternatively, or in addition, an interesting feature of the devices and methods described herein below may be that unwanted impeller deflection, or "flowering," is reduced, which may consequently result in tighter tip clearances and improved performance. Alternatively, or in addition, an interesting feature of the devices and methods described herein below may be the short travel path for cooling flow of air, which does not necessitate any pipes or manifolds. Alternatively, or in addition, an interesting feature of the devices and methods described herein below may be retention of circulating air in the combined compressor impellers and radial inflow turbines. Alternatively, or in addition, an interesting feature of the devices and methods described herein below may be that the diameters of the compressor impellers and the diameters of the radial inflow turbines of the combined compressor impellers and radial inflow turbines do not need to be the same, and the diameters of the compressor impellers and radial inflow turbines may be set for maximum cycle efficiency.

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

FIG. 1 illustrates a diametrical, forward-aft axial cross-sectional view of an example of a compressor turbine wheel 100 of a gas turbine engine. Compressor turbine wheel 100 includes compressor impeller 102, wheel body 124, and radial inflow turbine 104. Compressor impeller 102 may include forward impeller vane inlet(s) 114, radial impeller vane outlet(s) 116, a forward impeller case surface 118 extending from forward impeller vane inlet(s) 114 to radial impeller vane outlet(s) 116, an aft inner surface 120 extending from forward impeller vane inlet(s) 114 to radial impeller vane outlet(s) 116, and inner vane side walls 122 extending between forward impeller case surface 118 and aft inner surface 120. Radial inflow turbine 104 includes radial turbine vane inlet(s) 126, aft turbine vane outlet(s) 128, a forward inner turbine surface 130 extending from radial turbine vane inlet(s) 126 to aft turbine vane outlet(s) 128, an aft turbine case surface 132 extending from radial turbine vane inlet(s) 126 to aft turbine vane outlet(s) 128, and inner turbine vane side walls 134 extending between forward inner turbine surface 130 and aft turbine case surface 132.

Compressor turbine wheel 100 is rotatable about forward-aft axis 112. Compressor turbine wheel 100 is circular when viewed from the forward direction or the aft direction, with the forward-aft axis 112 passing through a forward-aft axial wheel bore circumferentially about forward-aft axis 112 at the center of compressor turbine wheel 100 when viewed from the forward direction or the aft direction. The wheel bore has a diameter 136. Compressor turbine wheel 100 has a radius extending perpendicularly from forward-aft axis 112, including, for example, along radius 140.

Compressor impeller 102 may be any rotating component configured to transfer energy from a power source driving the component rotation to a fluid being pumped by accelerating the fluid outward from the center of rotation. Compressor impeller 102 may be a short cylinder with an open inlet (such as forward impeller vane inlet(s) 114) configured to accept the incoming fluid and vanes to push the fluid radially outward. Compressor impeller 102 may have approximately a curved cone shape.

Radial inflow turbine 104 may be any turbine in which flow of the fluid in the turbine is radially outward with respect to the shaft, and smoothly orientated perpendicular to the rotation axis. Radial inflow turbine 104 of compressor turbine wheel 100 is configured to be cooled by conduction of heat to compressor impeller 102. Radial inflow turbine 104 may have approximately a curved cone shape.

Compressor impeller 102 is integral to wheel body 124 and radial inflow turbine 104 is integral to wheel body 124. Radial inflow turbine 104 is consequently integral to compressor impeller 102.

Radial impeller vane outlet(s) 116 is configured to flow compressed air radially outward to a diffuser 106. Air may then flow from diffuser 106 to deswirler 108. Air then enters combustor 110.

During operation of compressor turbine wheel 100, fluid flows into compressor impeller 102 through forward impeller vane inlet(s) 114 and into vane(s) of compressor impeller 102. As compressor turbine wheel 100 rotates, fluid in compressor impeller 102 may increase in pressure. Fluid flows out of compressor impeller 102 through radial impeller vane outlet(s) 116. Fluid may then flow radially outward to diffuser 106. Fluid flows from diffuser 106 to deswirler 108. After exiting deswirler 108, fluid may flows to space adjacent and radially outward of combustor 110. Fluid may then enter combustor 110. Fluid, which may include combustion gases, exits combustor 110 and may then flow through radial turbine vane inlet(s) 126 into radial inflow turbine 104. As compressor turbine wheel 100 rotates, fluid in radial inflow turbine 104 may increase in turbulence. Fluid flows out of radial inflow turbine 104 through aft turbine vane outlet(s) 128.

Radial turbine vane inlet(s) 126 is configured to receive combustion gases from combustor 110.

Figure 2:
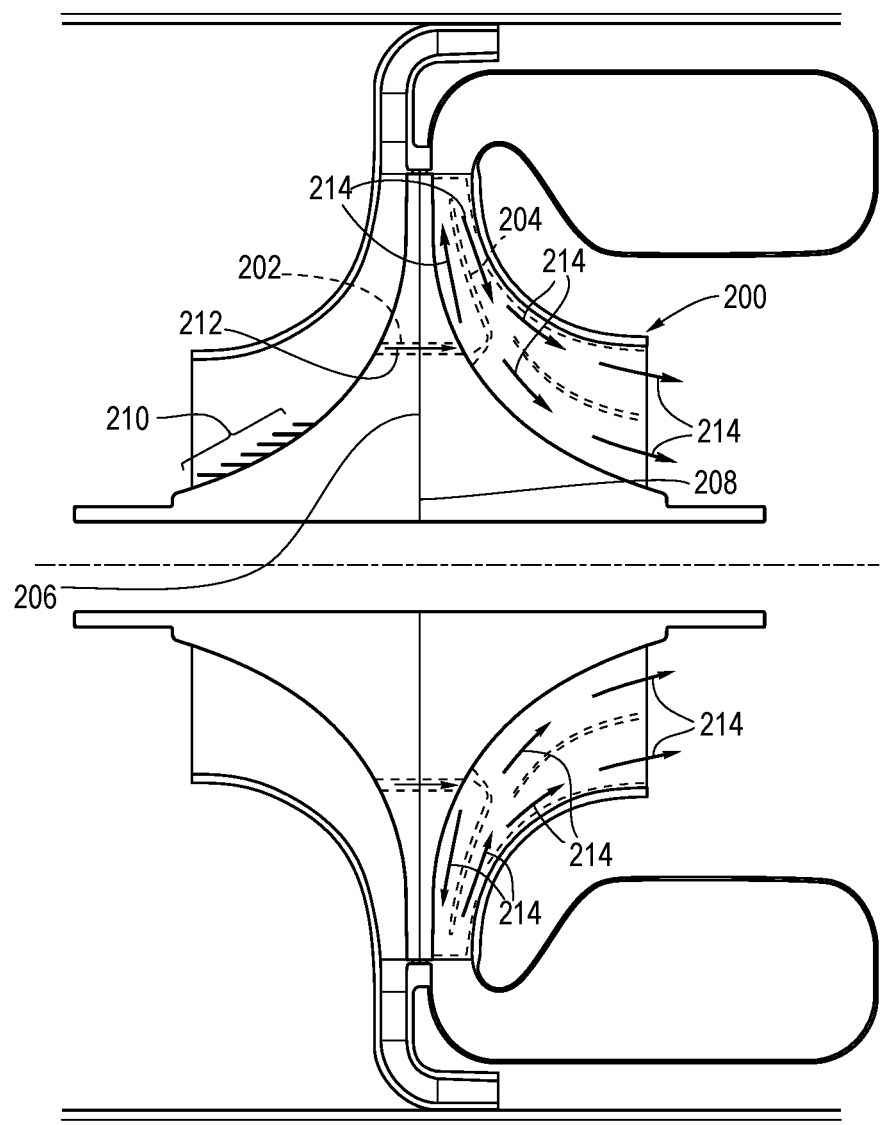
FIG. 2 illustrates a diametrical, forward-aft axial cross-sectional view of another example of a compressor turbine wheel.

FIG. 2 illustrates a diametrical, forward-aft axial cross-sectional view of another example of a compressor turbine wheel 200. Compressor turbine wheel 200 includes many of the same components performing the same functions as those described herein elsewhere. In the illustrated example, compressor turbine wheel 200 includes separately manufactured compressor impeller 102 and radial inflow turbine 104 that are attached together by techniques such as bonding, welding, friction welding, brazing, and/or any other type of mechanical coupling. Radial inflow turbine 104 is attached to compressor impeller 102 at an aft outer surface 208 of compressor impeller 102 by a forward outer surface 206 of radial inflow turbine 104. Aft outer surface 208 of compressor impeller 102 is fixed to forward outer surface 206 of radial inflow turbine 104. One or more surfaces of compressor turbine wheel 200 may include rib(s) 210 projecting outward from the one or more surfaces. A passage 202 extends between aft inner surface 120 and forward inner turbine surface 130.

Aft inner surface 120 may include rib(s) 210 projecting outward from aft inner surface 120 configured to increase surface area of aft inner surface 120. Rib(s) 210 may project in a forward direction from aft inner surface 120 in concentric arcs at different radii about forward-aft axis 112. Rib(s) 210 may project outward from inner vane side walls 122 configured to increase surface area of inner vane side walls 122.

Rib(s) 210 may project in an aft direction from forward inner turbine surface 130 in concentric arcs at different radii about forward-aft axis 112 and/or from inner turbine vane side walls 134 configured to increase surface area of forward inner turbine surface 130 and/or inner turbine vane side walls 134.

Passage 202 is configured to direct flow of air between compressor impeller 102 and radial inflow turbine 104 and may be configured to provide cooling air directly to radial inflow turbine 104 as illustrated by arrow 212 shown in FIG. 2. Passage 202 may vary in diameter or width and have a cross-sectional shape and path as is necessary, desirable, or preferable to achieve beneficial flow of air through passage 202. Passage 202 may pass straight through compressor impeller 102 and radial inflow turbine 104 along a line that is parallel to forward-aft axis 112 as shown in FIG. 2, or take a less direct path through compressor impeller 102 and radial inflow turbine 104.

Vane(s) 204 in radial inflow turbine 104 are surfaces within the turbine vanes configured to increase surface area and direct flow of air through radial inflow turbine 104 to cool radial inflow turbine 104 and aft through aft turbine vane outlet 128 as illustrated by arrows 214 shown in FIG. 2.

During operation of compressor turbine wheel 200, fluid flows through into compressor impeller 102 through forward impeller vane inlet(s) 114 and into vane(s) of compressor impeller 102. As compressor turbine wheel 200 rotates, fluid in compressor impeller 102 may increase in pressure. Fluid flows out of compressor impeller 102 through passage 202, as illustrated by arrows 212, bypassing diffuser 106, deswirler 108, and combustor 110 to provide cooling air directly to turbine vane(s) of radial inflow turbine 104. As compressor turbine wheel 100 rotates, fluid in compressor impeller 102 may increase in turbulence as it passes through vane(s) 204 as illustrated by arrows 214. Fluid flows out of radial inflow turbine 104 through aft turbine vane outlet(s) 128.

Figure 3:
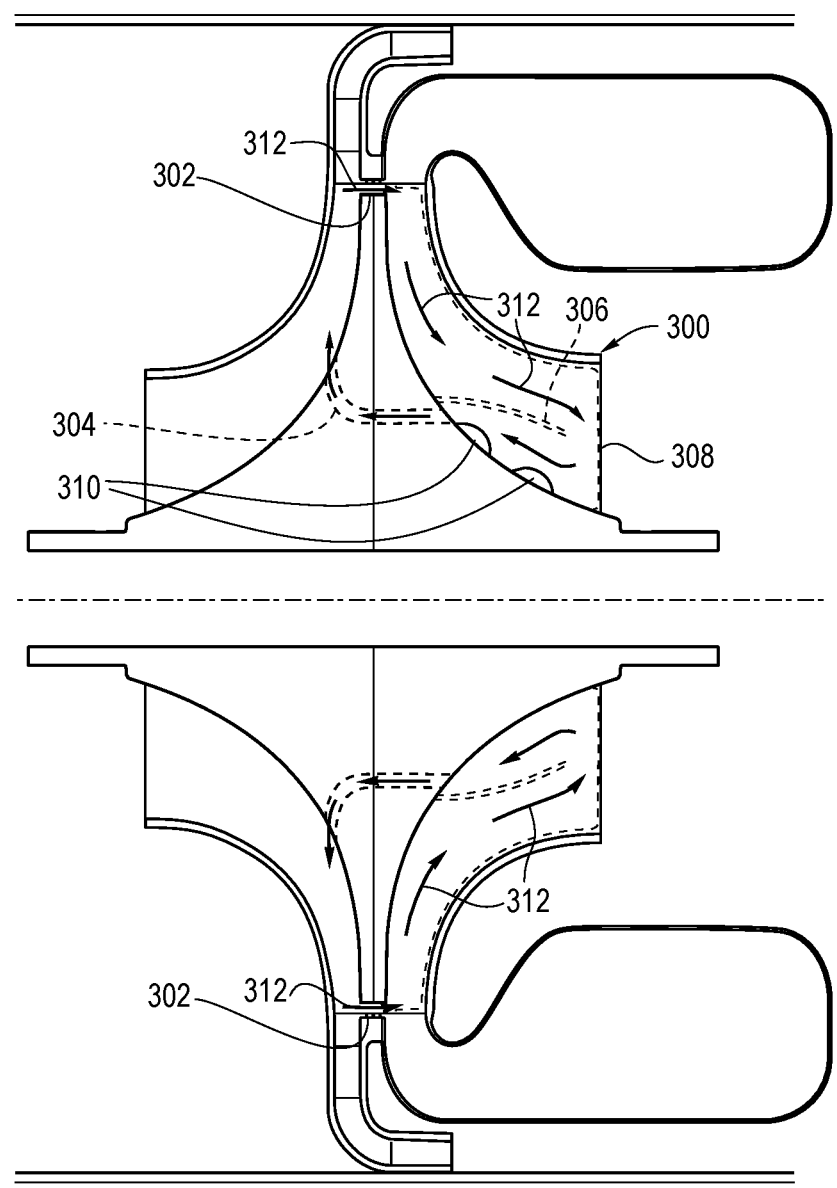
FIG. 3 illustrates a diametrical, forward-aft axial cross-sectional view of yet another example of a compressor turbine wheel.

FIG. 3 illustrates a diametrical, forward-aft axial cross-sectional view of yet another example of a compressor turbine wheel 300. Compressor turbine wheel 300 includes many of the same components performing the same functions as those described herein elsewhere. Compressor turbine wheel 300 includes a passage 302 and a passage 304 extending between aft inner surface 120 and forward inner turbine surface 130. Aft turbine vane outlet 308 may be sealed so as to circulate air back to compressor impeller 202, though radial inflow turbine 104 may still provide for combustion gases to separately exit radial inflow turbine 104. Radial inflow turbine 104 may include vane(s) 306. Radial inflow turbine 104 may include bump(s) 310 on forward inner turbine surface 130.

Vane(s) 306 in radial inflow turbine 104 are surfaces within the turbine vanes configured to increase surface area and direct flow of air through radial inflow turbine 104 to cool radial inflow turbine 104 and aft through aft turbine vane outlet 128 as illustrated by arrows 312 shown in FIG. 3.

Passage 302 is configured to direct flow of air from compressor impeller 102 to radial inflow turbine 104 as illustrated by arrows 312 in FIG. 3. Passage 304 also extends between aft inner surface 120 and forward inner turbine surface 130 configured to return flow of air from radial inflow turbine 104 back to compressor impeller 102 as illustrated by arrows 312 in FIG. 3. Passages 302, 304 may vary in diameter or width and have a cross-sectional shape and path as is necessary, desirable, or preferable to achieve beneficial flow of air through passages 302, 304. In compressor turbine wheel 300, passage 302 is radially outward relative to passage 304. In other examples, passage 304 may be radially outward relative to passage 302. In yet other examples, passage 302 and passage 304 may be equidistant from forward-aft axis 112. In still other examples, a compressor turbine wheel 300 may include more than two passages extending between compressor impeller 102 and radial inflow turbine 104.

Bump(s) 310 may also be located on inner turbine vane side walls 134. Bump(s) 310 may be configured to increase surface area of forward inner turbine surface 130 and/or inner turbine vane side walls 234 and consequently increase turbulence of air flowing through radial inflow turbine 104.

During operation of compressor turbine wheel 300, fluid flows through into compressor impeller 102 through forward impeller vane inlet(s) 114 and into vane(s) of compressor impeller 102. As compressor turbine wheel 300 rotates, fluid in compressor impeller 102 may increase in pressure. Fluid flows out of compressor impeller 102 through passage 302, bypassing diffuser 106, deswirler 108, and combustor 110 to provide cooling air directly to turbine vane(s) of radial inflow turbine 104. As compressor turbine wheel 300 rotates, fluid in compressor impeller 102 may increase in turbulence as it passes through vane(s) 306 as illustrated by arrows 312. Fluid flows from radial inflow turbine 104 back to compressor impeller 102 through passage 304, such that, advantageously, cooling fluid is conserved.

Figure 4:
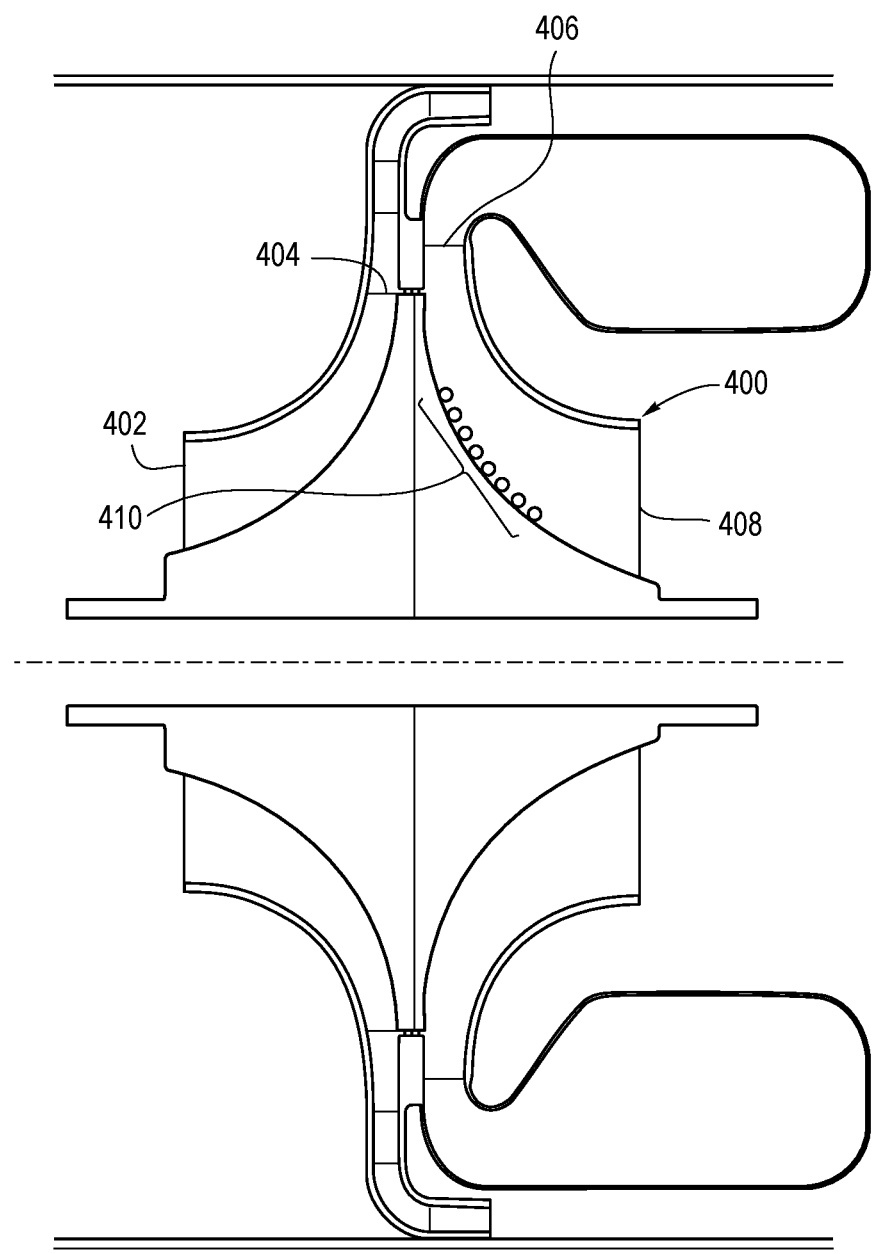
FIG. 4 illustrates a diametrical, forward-aft axial cross-sectional view of yet another example of a compressor turbine wheel.

FIG. 4 illustrates a diametrical, forward-aft axial cross-sectional view of yet another example of a compressor turbine wheel 400. Compressor turbine wheel 400 includes many of the same components performing the same functions as those described herein elsewhere. Compressor turbine wheel 400 includes forward impeller vane inlet(s) 402 and aft turbine vane outlet(s) 408 that may have the same or different diameters, as is necessary, desirable, or preferable to maximize cycle efficiency. Forward inner turbine surface 130 may include turbulator(s) 410 projecting outward from forward inner turbine surface 130.

Radial impeller vane outlet(s) 404 may be radially inward or radially outward relative to radial turbine vane inlet(s) 406, as a consequence of the diameter of compressor impeller 102 being less or greater, respectively, than the diameter of radial inflow turbine 104, as is necessary, desirable, or preferable to maximize cycle efficiency. Alternatively, compressor impeller 102 may have the same diameter as radial inflow turbine 104, and radial impeller vane outlet(s) 404 may not be radially inward or radially outward relative to radial turbine vane inlet(s) 406.

Turbulator(s) 410 may be any device configured to turn a laminar boundary layer of fluid into a turbulent boundary layer. Turbulator(s) 410 may additionally be configured to increase surface area of forward inner turbine surface 130 and increase turbulence of air flowing through radial inflow turbine 104. Turbulator(s) 410 may project in an aft direction. Turbulator(s) 410 may project outward from inner turbine vane side walls 134 configured to increase surface area of inner turbine vane side walls 134 and consequently increase turbulence of air flowing through radial inflow turbine 104.

During operation of compressor turbine wheel 400, fluid flows through into compressor impeller 102 through forward impeller vane inlet(s) 114 and into vane(s) of compressor impeller 102. As compressor turbine wheel 400 rotates, fluid in compressor impeller 102 may increase in pressure. Fluid flows out of compressor impeller 102 through radial impeller vane outlet(s) 116. Fluid may then flow radially outward to diffuser 106. Fluid flows from diffuser 106 to deswirler 108. After exiting deswirler 108, fluid may flow to space adjacent and radially outward of combustor 110. Fluid may then enter combustor 110. Fluid, which may include combustion gases, exits combustor 110 and may then flow through radial turbine vane inlet(s) 126 into radial inflow turbine 104. As compressor turbine wheel 400 rotates, fluid in compressor impeller 102 may increase in turbulence. Turbulator(s) 410 may increase turbulence of fluid in radial inflow turbine 104. Fluid flows out of radial inflow turbine 104 through aft turbine vane outlet(s) 128.

Figure 5:
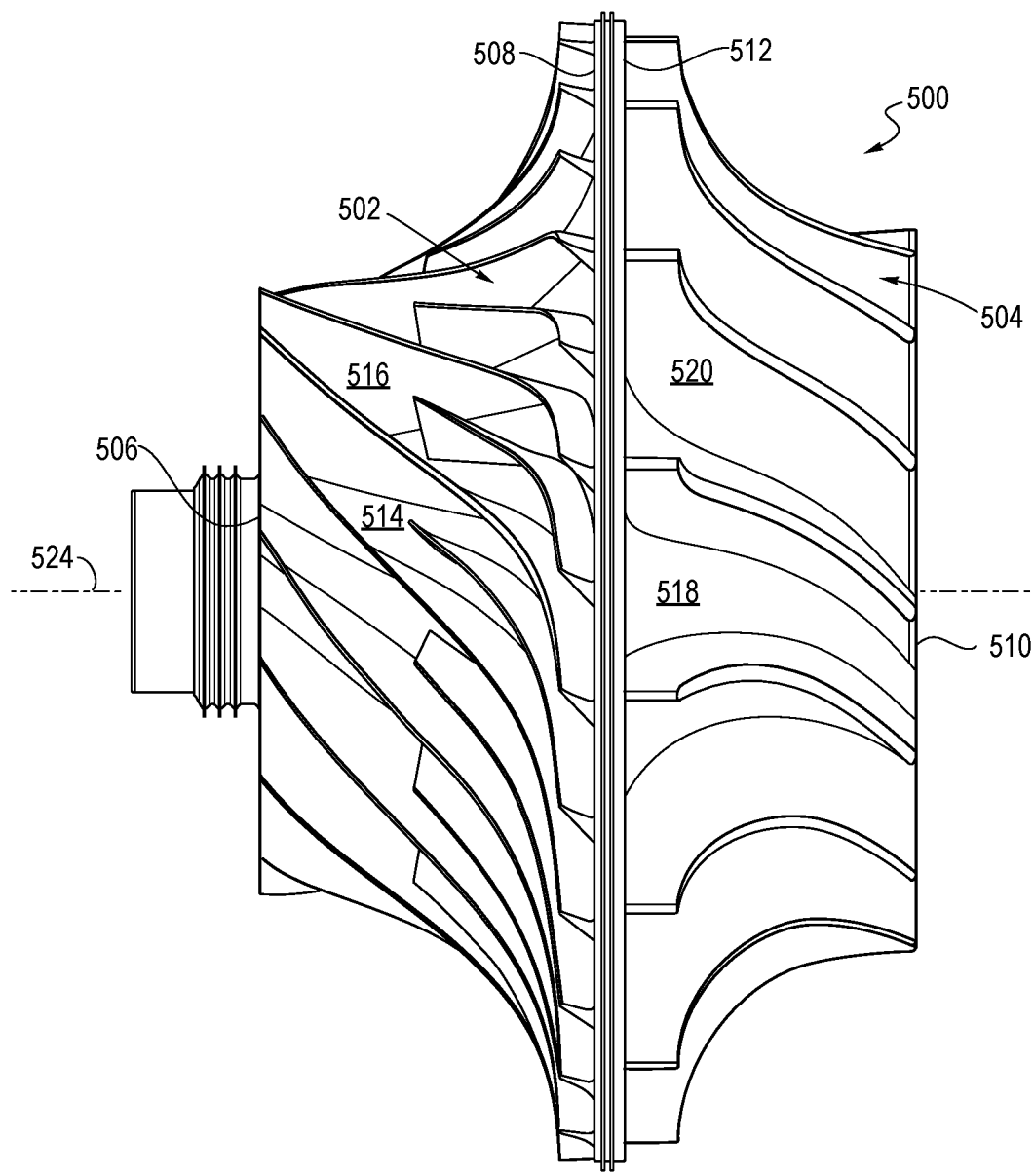
FIG. 5 illustrates a side view of yet another example of a compressor turbine wheel.
Figure 6:
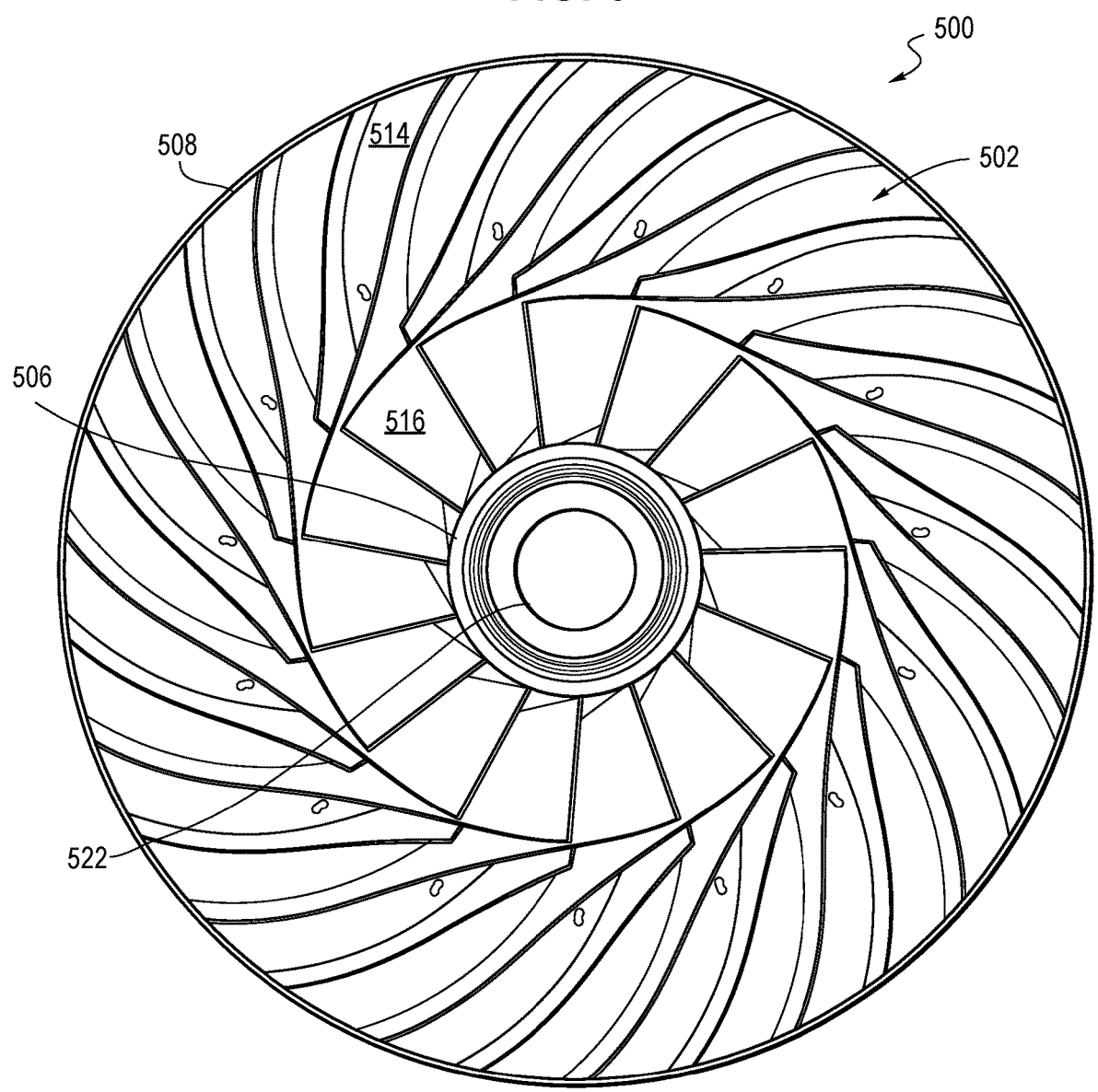
FIG. 6 illustrates a forward view of the example of a compressor turbine wheel of FIG. 5.
Figure 7:
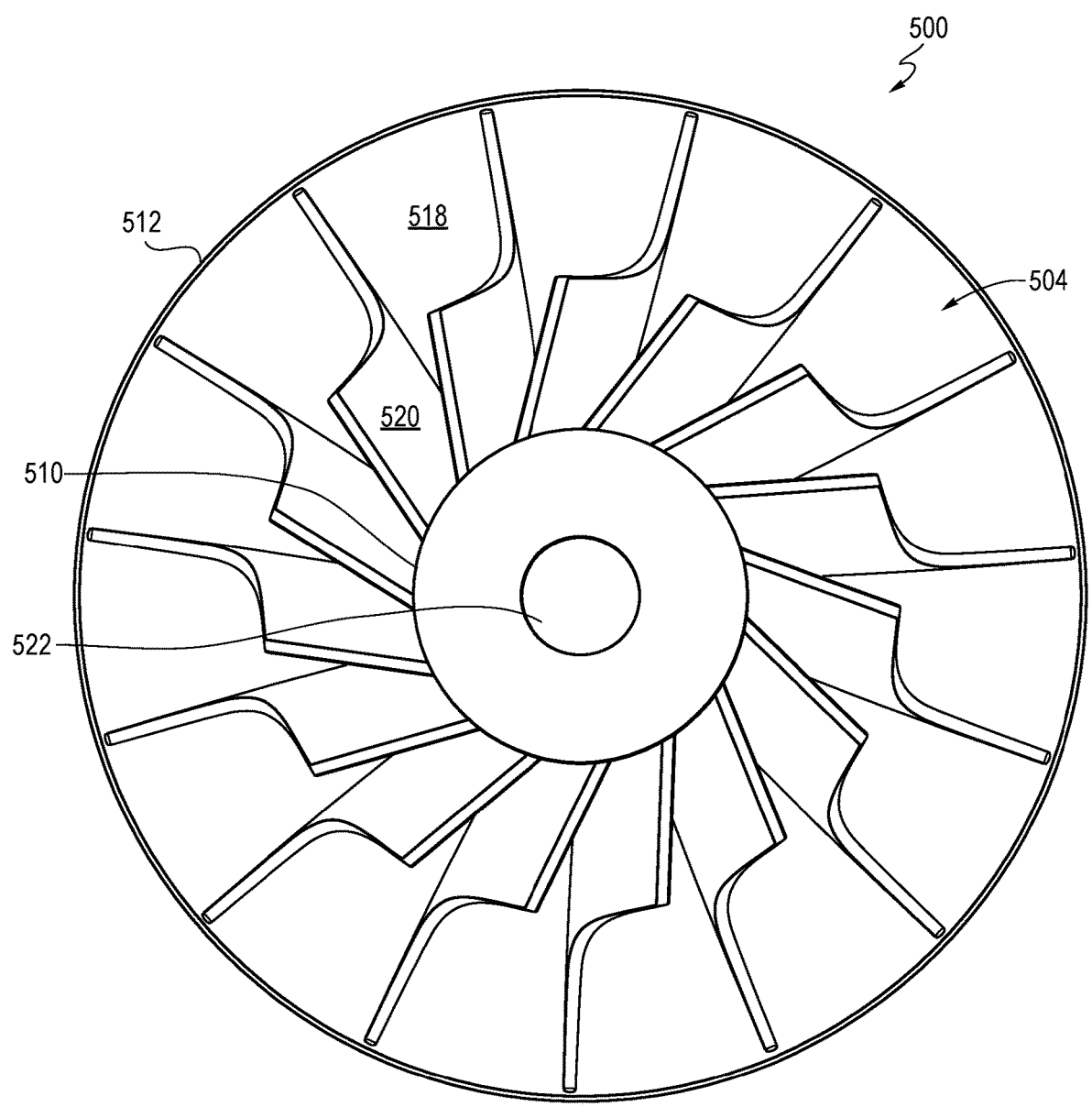
FIG. 7 illustrates an aft view of the example of a compressor turbine wheel of FIG. 5.
Figure 8:
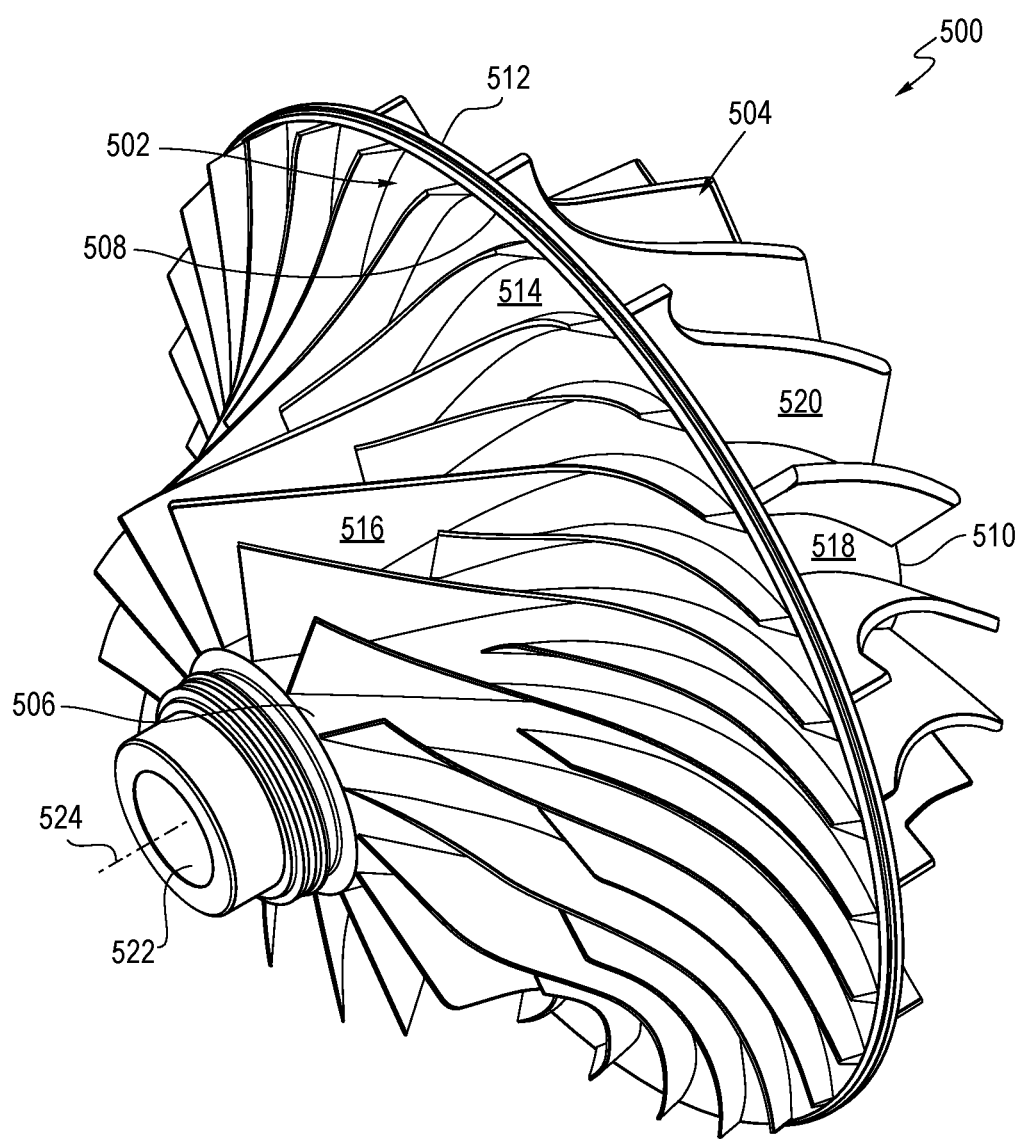
FIG. 8 illustrates a top perspective view of the example of a compressor turbine wheel of FIG. 5.

FIG. 5 illustrates a side view of yet another example of a compressor turbine wheel 500. Compressor turbine wheel 500 includes compressor impeller 502 and radial inflow turbine 504. Compressor impeller 502 includes forward impeller vane inlets 506, radial impeller vane outlets 508, an aft inner surface 514 extending from forward impeller vane inlets 506 to radial impeller vane outlets 508, and inner vane side walls 516 projecting forward from aft inner surface 514. Radial inflow turbine 504 includes radial turbine vane inlets 512, aft turbine vane outlets 510, a forward inner turbine surface 518 extending from radial turbine vane inlets 512 to aft turbine vane outlets 510, and inner turbine vane side walls 520 projecting aft from forward inner turbine surface 518. Compressor turbine wheel 500 is rotatable about forward-aft axis 524. Compressor turbine wheel 500 is circular when viewed from the forward direction as in FIG. 6 or the aft direction as in FIG. 7, with the forward-aft axis 524 passing through a forward-aft axial wheel bore 522 circumferentially about forward-aft axis 524 at the center of compressor turbine wheel 500 when viewed from the forward direction as in FIG. 6 or the aft direction as in FIG. 7. FIG. 8 illustrates a top perspective view of compressor turbine wheel 500.

During operation of compressor turbine wheel 500, fluid flows into compressor impeller 502 through forward impeller vane inlets 506 and into vane(s) of compressor impeller 502. As compressor turbine wheel 500 rotates, fluid in compressor impeller 502 may increase in pressure. Fluid flows out of compressor impeller 502 through radial impeller vane outlets 508. Fluid may then flow radially outward to diffuser 106. Fluid flows from diffuser 106 to deswirler 108. After exiting deswirler 108, fluid may flows to space adjacent and radially outward of combustor 110. Fluid may then enter combustor 110. Fluid, which may include combustion gases, exits combustor 110 and may then flow through radial turbine vane inlets 512 into radial inflow turbine 504. As compressor turbine wheel 500 rotates, fluid in radial inflow turbine 504 may increase in turbulence. Fluid flows out of radial inflow turbine 504 through aft turbine vane outlets 510.

A gas turbine engine that includes compressor turbine wheel 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, a gas turbine engine may be utilized in a configuration unrelated to an aircraft such as, for example, an industrial application, an energy application, a power plant, a pumping set, a marine application (for example, for naval propulsion), a weapon system, a security system, a perimeter defense or security system.

A gas turbine engine may operate with a convertible configuration in either a turbofan mode or a turboshaft mode. The gas turbine engine may take a variety of forms in various embodiments. In some forms, the gas turbine engine may be a turbojet or turboprop engine with a convertible configuration. Furthermore, the gas turbine engine may be an adaptive cycle and/or variable cycle engine. Other variations are also contemplated.

The gas turbine engine may include a forward intake section, a compressor section, a combustion section, a turbine section, and an aft exhaust section. As noted above, the hot, high pressure fluid exiting the impeller and combustor passes through the turbine section during operation of gas turbine engine. As the fluid flows through the turbine section, the fluid passes between blades of the turbine causing the turbine to rotate. The rotating turbine may turn the shaft such that the blades may rotate around an axis of rotation, such as the centerline of the gas turbine engine. The blades of the turbine may extend radially outward from the centerline of the turbine and rotate circumferentially relative to the centerline.

The terms "brazing," "brazed," and "braze," unless stated otherwise, alone or in combination with other terms, refer to a metal-joining process known in the art in which two or more surfaces that are free of oxides are joined together by melting a flowing a filler metal into the joint, the filler metal having a lower melting point than the adjoining two or more surfaces. The process of "brazing" does not involve melting the two or more surfaces together. Further, the process of "brazing" requires that the two or more surfaces are much more closely fitted surfaces than in soldering. During the process of "brazing," the filler metal flows into the gap between the closely fitting two or more surfaces by capillary action.

The terms "welding," "welded," and "weld," unless stated otherwise, alone or in combination with other terms, refer to a metal-joining process known in the art in which two or more surfaces are melted, joined together, and allowed to cool once together, causing fusion. In addition to melting the base metal surfaces, a filler material is often added to the joint to form a pool of molten material that cools to form a joint that may be stronger than the base material. Pressure may also be used in conjunction with heat to produce a weld.

The term "aft," as used herein, unless stated otherwise, alone or in combination with other terms, refers to an element, surface, or assembly being situated at, near, or toward a tail of an aircraft of other vehicle. The term "aft" may be distinguished from the term "forward," which, as used herein, unless stated otherwise, alone or combination with other terms, refers to an element, surface, or assembly being situated at, near, or toward a front of an aircraft or other vehicle. The forward and aft directions may refer to opposite directions along an axis, which may be parallel to, or identical to, a centerline of a gas turbine engine and/or forward-aft axis 112. The terms "axial" and "axially," as used herein, unless stated otherwise, alone or in combination with other terms, refers to elements, surfaces, and assemblies along a common axis, which may be forward or aft relative to other elements, surfaces, and/or assemblies.

The terms "radially" and "radial," as used herein, unless stated otherwise, alone or in combination with other terms, refer to elements, surfaces, or assemblies relative to one another along a radius, such as radius 140, or parallel to or coplanar with radius 140, that may project perpendicularly from a centerline axis, which may be parallel to, or identical to, a centerline of a gas turbine engine and/or forward-aft axis 112. The terms "inward" and "inwardly," as used herein, unless stated otherwise, alone or combination with other terms, refer to an element, surface, or assembly being situated at, near, or toward the centerline axis along a radius, which may be radius 240 or parallel to or coplanar with radius 240. The terms "outward" and "outwardly," as used herein, unless stated otherwise, alone or in combination with other terms, refer to an element, surface, or assembly being situated, or facing, away from, the centerline axis along a radius, which may be radius 240 or parallel to, or coplanar with radius 240. The terms "inward" and "inwardly" and the terms "outward" and "outwardly" may refer to opposite directions along a radius projecting perpendicularly from the centerline axis.

The terms "circumferential" and "circumferentially," as used herein, unless stated otherwise, alone or in combination with other terms, refer to elements, surfaces, or assemblies relative to one another encircling a centerline axis at a radius. Alternatively, or in addition, the terms "circumferential" and "circumferentially," as used herein, unless stated otherwise, alone or in combination with other terms, mean relating to a circumference of a circle centered on, and perpendicular to, a centerline axis.

The terms "cast" and "casting," as used herein, unless stating otherwise, alone or in combination with other terms, refer to a process in which a liquid metal is delivered into a mold that contains a negative impression, or three-dimensional negative image) of an intended shape through a sprue, followed by cooling of the metal and mold.

The terms "injection molding" and "injection molded," as used herein, unless stated otherwise, alone or in combination with other terms, refer to a process for producing parts by injecting molten material including metals, glasses, elastomers, confections, and thermoplastic or thermosetting polymers into a mold cavity, where the molten material cools and hardens to the configuration of the cavity. Advances in three-dimensional printing technology have resulted in photopolymers that do not melt during the injection molding of lower temperature thermoplastics being used for some simple injection molds.

The terms "three-dimensionally printing" and "three-dimensionally printed," as used herein, unless stated otherwise, alone or in combination with other terms, refer to a variety of processes in which material is joined or solidified under computer control to create a three-dimensional object or part, which material being added together, such as liquid molecules or powder grains being fused together, typically layer by layer.

The terms "abrasive machining" and "abrasively machined," as used herein, unless stated otherwise, alone or in combination with other terms, refer to a machining process where material is removed from a workpiece using a multitude of small abrasive particles by forcing the abrasive particles, or grains, into the surface of the workpiece so that each particle cuts away a small bit of material. Common examples of abrasive machining include grinding, honing, and polishing.

The term "conduction," as used herein, unless stated otherwise, alone or in combination with other terms, refers to a transfer of internal energy by microscopic collisions of particles and movement of electrons within a body. The colliding particles, which include molecules, atoms, and electrons, transfer disorganized microscopic kinetic and potential energy. The rate at which energy is conducted as heat between two bodies depends on the temperature difference and the properties of the conductive interface through which the heat is transferred. In conduction, heat flow is within and through the body itself.

Examples of compressor turbine wheels of the present disclosure may be composed of metal and/or ceramic material. Examples of metals may include, but are not limited to, titanium, such as high-temperature Arconic-Thor, or a nickel-based superalloy, such as IN718, or MarM247. Examples of ceramics may include, but are not limited to, monolithic ceramics, such as silicon nitride, or composite ceramics, such as SiC—SiC ceramic matrix composite ("CMC").

In the context of the present disclosure, a first piece is said to be "integral" to a second piece if the first and second pieces are formed as a single piece. For example, if the first and second pieces are cast as a single metal or metal alloy piece, then the first piece is integral to the second piece. However, if the first and second pieces are separately formed, and subsequently attached or fixed together, then the first piece is not integral to the second piece.

All methods described herein may be performed in any suitable order unless otherwise indicated herein or otherwise clearly contradicted by context.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more." These terms, which refer to the inclusion of a single element or a plurality of the elements, may also be represented by the suffix "(s)" at the end of the element.

While various examples have been described, it will be apparent to those of ordinary skill in the art that many more examples and implementations are possible. Accordingly, the examples described herein are not the only possible implementations.

The subject-matter of the disclosure may also relate, among others, to the following aspects:

A first aspect relates to a compressor turbine wheel for a gas turbine engine, the compressor turbine wheel rotatable about a forward-aft axis passing through a forward-aft axial wheel bore at a center of the compressor turbine wheel, the compressor turbine wheel comprising: a compressor impeller comprising a forward impeller vane inlet, a radial impeller vane outlet configured to flow compressed air radially outward to a diffuser, an aft inner surface extending from the forward impeller vane inlet to the radial impeller vane outlet, and inner vane side walls projecting forward from the aft inner surface; and a radial inflow turbine aft of the compressor impeller and comprising a radial turbine vane inlet configured to receive combustion gases from a combustor, an aft turbine vane outlet, a forward inner turbine surface extending from the radial turbine vane inlet to the aft turbine vane outlet, and inner turbine vane side walls projecting aft from the forward inner turbine surface; and wherein the radial inflow turbine is integral to the compressor impeller or an aft outer surface of the compressor impeller is fixed to a forward outer surface of the radial inflow turbine.

A second aspect relates to the compressor turbine wheel of aspect 1, wherein the aft inner surface and/or the inner vane side walls comprise a rib configured to increase surface area of the aft inner surface and/or the inner vane side walls.

A third aspect relates to the compressor turbine wheel of any preceding aspect, wherein the forward inner turbine surface and/or the inner turbine vane side walls comprise a pin, a rib, a vane, and/or a turbulator configured to increase surface area of the forward inner turbine surface and/or the inner turbine vane side walls.

A fourth aspect relates to the compressor turbine wheel of any preceding aspect, wherein a passage extends between the aft inner surface and the forward inner turbine surface, the passage configured to provide direct flow of air between the compressor impeller and the radial inflow turbine.

A fifth aspect relates to the compressor turbine wheel of aspect 4, wherein two or more passages extend between the aft inner surface and the forward inner turbine surface configured to circulate air between the compressor impeller and the radial inflow turbine.

A sixth aspect relates to the compressor turbine wheel of aspect 4, wherein a second passage extends between the aft inner surface and the forward inner turbine surface; wherein the passage is configured to direct flow of air from the compressor impeller to the radial inflow turbine to cool the radial inflow turbine; and wherein the second passage is configured to return flow of air from the radial inflow turbine to the compressor impeller.

A seventh aspect relates to the compressor turbine wheel of any preceding aspect, wherein the compressor turbine wheel is configured to cool the radial inflow turbine by conduction from the radial inflow turbine to the compressor impeller.

An eighth aspect relates to the compressor turbine wheel of any preceding aspect, wherein the compressor turbine wheel is cast, injection molded, three-dimensionally printed, or abrasively machined.

A ninth aspect relates to the compressor turbine wheel of any preceding aspect, wherein the compressor turbine wheel is metal or ceramic.

A tenth aspect relates to the compressor turbine wheel of any preceding aspect, wherein a forward outer surface of the radial inflow turbine is brazed or welded to an aft outer surface of the compressor impeller.

An eleventh aspect relates to a method of cooling a radial inflow turbine of a gas turbine engine rotatable about a forward-aft axis, comprising: transferring heat from the radial inflow turbine to a compressor impeller via conduction through the radial inflow turbine and the compressor impeller; and wherein the radial inflow turbine is integral to the compressor impeller, or an aft outer surface of the compressor is fixed to a forward outer surface of the radial inflow turbine.

A twelfth aspect relates to the method of aspect 11, wherein the transferring comprises: conducting heat from the radial inflow turbine to the compressor impeller.

A thirteenth aspect relates to the method of aspect 11, wherein the transferring comprises: flowing air aft form the compressor impeller to the radial inflow turbine through a passage between an aft inner surface of the compressor impeller and a forward inner turbine surface of the radial inflow turbine, the aft inner surface extending from a forward impeller vane inlet to a radial impeller vane outlet, the forward inner turbine surface extending from a radial turbine vane inlet to an aft turbine vane outlet.

A fourteenth aspect relates to the method of aspects 11 and 13, wherein the transferring comprises: flowing air forward from the radial inflow turbine to the compressor impeller through a second passage between the aft inner surface and the forward inner surface.

A fifteenth aspect relates to the method of aspects 11 to 14, further comprising: increasing turbulence of air flowing through the radial inflow turbine.

In addition to the features mentioned in each of the independent aspects enumerated above, some examples may show, alone or in combination, the optional features mentioned in the dependent aspects and/or as disclosed in the description above and shown in the figures.

What is claimed is:

1. A compressor turbine wheel for a gas turbine engine, the compressor turbine wheel rotatable about a forward-aft axis passing through a forward-aft axial wheel bore at a center of the compressor turbine wheel, the compressor turbine wheel comprising:
    a compressor impeller comprising a forward impeller vane inlet, a radial impeller vane outlet configured to flow compressed air radially outward to a diffuser, an aft inner impeller surface extending from the forward impeller vane inlet to the radial impeller vane outlet, and inner impeller vane side walls projecting forward from the aft inner impeller surface; and
    a radial inflow turbine aft of the compressor impeller and comprising a radial turbine vane inlet configured to receive combustion gases from a combustor, an aft turbine vane outlet, a forward inner turbine surface extending from the radial turbine vane inlet to the aft turbine vane outlet, an aft turbine case surface extending from the radial turbine vane inlet to the aft turbine vane outlet, and inner turbine vane side walls projecting aft from the forward inner turbine surface;
    a passage extending between the aft inner impeller surface and the forward inner turbine surface, the passage configured to provide direct flow of air between the compressor impeller and the radial inflow turbine; and
    a vane in the radial inflow turbine, the vane configured to direct the air the vane receives from the passage radially outward toward the radial turbine vane inlet and then radially inward toward the aft turbine vane outlet, the vane is located between the forward inner turbine surface and the aft turbine case surface and radially inward and spaced apart from the radial turbine vane inlet,
    wherein the air received from the passage flows radially outward and axially between the forward inner turbine surface and the vane and then flows radially inward and axially between the vane and the aft turbine case surface,
    wherein the compressor impeller and the radial inflow turbine are separately formed; and
    wherein an aft outer surface of the compressor impeller is affixed to a forward outer surface of the radial inflow turbine.

2. The compressor turbine wheel of claim 1, wherein the aft inner impeller surface and/or the inner impeller vane side walls comprise a rib configured to increase surface area of the aft inner impeller surface and/or the inner impeller vane side walls.

3. The compressor turbine wheel of claim 1, wherein the vane is configured to increase surface area of the forward inner turbine surface and/or the inner turbine vane side walls.

4. The compressor turbine wheel of claim 1, wherein the compressor turbine wheel is configured to cool the radial inflow turbine by conduction from the radial inflow turbine to the compressor impeller.

5. The compressor turbine wheel of claim 1, wherein the compressor turbine wheel is cast, injection molded, three-dimensionally printed, or abrasively machined.

6. The compressor turbine wheel of claim 1, wherein the compressor turbine wheel is metal or ceramic.

7. The compressor turbine wheel of claim 1, wherein the radial turbine vane inlet defines a radially outmost end of the radial inflow turbine.

8. The compressor turbine wheel of claim 1, wherein the compressor turbine wheel is ceramic.

9. The compressor turbine wheel of claim 1, wherein the radial turbine vane inlet receives combustion gases directly from the combustor.

10. The compressor turbine wheel of claim 1, wherein the forward inner turbine surface comprises a rib projecting outwardly away from the forward inner turbine surface and configured to increase surface area of the forward inner turbine surface.

11. The compressor turbine wheel of claim 1, wherein the passage extends between the aft inner impeller surface and the forward inner turbine surface along a line that is parallel to the forward-aft axis.

12. A compressor turbine wheel for a gas turbine engine, the compressor turbine wheel rotatable about a forward-aft axis passing through a forward-aft axial wheel bore at a center of the compressor turbine wheel, the compressor turbine wheel comprising:
  a compressor impeller comprising a forward impeller vane inlet, a radial impeller vane outlet configured to flow compressed air radially outward to a diffuser, an aft inner impeller surface extending from the forward impeller vane inlet to the radial impeller vane outlet, and inner impeller vane side walls projecting forward from the aft inner impeller surface; and
  a radial inflow turbine aft of the compressor impeller and comprising a radial turbine vane inlet configured to receive combustion gases from a combustor, an aft turbine vane outlet, a forward inner turbine surface extending from the radial turbine vane inlet to the aft turbine vane outlet, an aft turbine case surface extending from the radial turbine vane inlet to the aft turbine vane outlet, and inner turbine vane side walls projecting aft from the forward inner turbine surface;
  wherein an aft outer surface of the compressor impeller is affixed to a forward outer surface of the radial inflow turbine;
  wherein a passage extends between the aft inner impeller surface and the forward inner turbine surface, the passage configured to provide cooling air from the compressor impeller to the radial inflow turbine; and
  wherein a vane in the radial inflow turbine is configured to direct the cooling air from the passage radially outward toward the radial turbine vane inlet and then radially inward toward the aft turbine vane outlet, the vane is located between the forward inner turbine surface and the aft turbine case surface and radially inward and spaced apart from the radial turbine vane inlet,
  wherein the air received from the passage flows radially outward and axially between the forward inner turbine surface and the vane and then flows radially inward and axially between the vane and the aft turbine case surface.

13. The compressor turbine wheel of claim 12, wherein the aft inner impeller surface and/or the inner impeller vane side walls comprise a rib configured to increase surface area of the aft inner impeller surface and/or the inner impeller vane side walls.

14. The compressor turbine wheel of claim 12, wherein the vane is configured to increase surface area of the forward inner turbine surface and/or the inner turbine vane side walls.

15. The compressor turbine wheel of claim 12, wherein the forward outer surface of the radial inflow turbine is brazed or welded to the aft outer surface of the compressor impeller.

16. The compressor turbine wheel of claim 12, wherein the compressor turbine wheel is metal or ceramic.

17. The compressor turbine wheel of claim 12, wherein the forward inner turbine surface comprises a rib projecting outwardly away from the forward inner turbine surface and configured to increase surface area of the forward inner turbine surface.

18. The compressor turbine wheel of claim 12, wherein the radial turbine vane inlet is formed at a terminal end of the radial inflow turbine.

19. The compressor turbine wheel of claim 12, wherein the passage extends axially through the compressor impeller and the radial inflow turbine, and wherein an entirety of the passage is parallel to the forward-aft axis.

20. The compressor turbine wheel of claim 12, wherein the passage extends through the compressor impeller and the radial inflow turbine near a midpoint of the compressor turbine wheel located radially between the radial turbine vane inlet and the forward-aft axis.

* * * * *